Sept. 5, 1944. J. QUINTILE 2,357,720
ADJUSTABLE REAR VIEW MIRROR
Filed Jan. 11, 1941

INVENTOR.
Joseph Quintile
BY C. Lauren Maltby
Attorney.

Patented Sept. 5, 1944

2,357,720

UNITED STATES PATENT OFFICE 2,357,720

ADJUSTABLE REARVIEW MIRROR

Joseph Quintile, Los Angeles, Calif.

Application January 11, 1941, Serial No. 374,095

1 Claim. (Cl. 88—93)

This invention relates to automotive accessories and more especially to an adjustable rear-view mirror.

An object of the invention is to provide a simple practical and inexpensive article of the character described.

Another object of the invention is to provide an adjustable rear-view mirror for motor vehicles.

A further object of the invention is to provide a rear-view mirror adapted to be quickly tilted or swung out of normal position so that the head light glare of a following motor vehicle will not strike the eyes of the operator of the first motor vehicle.

Other objects and advantages will appear to be brought out more fully in the following specification, reference being had to the accompanying drawing, wherein Fig. 1 is a view illustrating the invention in use.

Fig. 5 is a fragmentary sectional view taken along the line 5—5 of Fig. 2, and

Fig. 6 is a perspective view of the rear side of the mirror.

Figure 1:
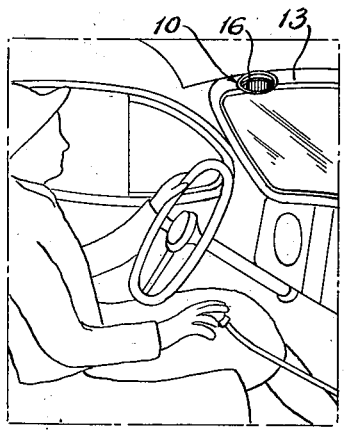
Figure 3:
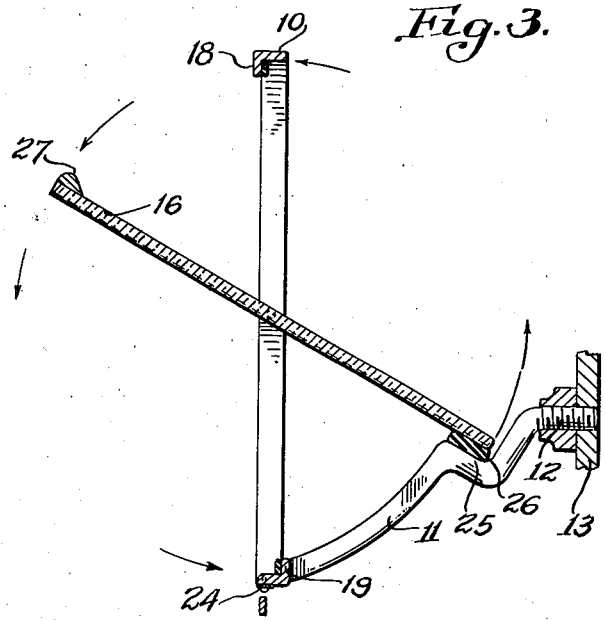
Fig. 3 is a sectional view taken along the line 3—3 of Fig. 2.

Referring more particularly to the drawing, I show a mirror frame arm 11, provided with a threaded end portion 12, or the like by which it is secured to and supported from a frame member 13 of the motor vehicle. Frame 10 may be of any preferred shape and is provided with a pair of bearings 14 for a pair of trunnion pins 15 secured to mirror 16 and rotatably mounted in bearings 14. A spring 17 is provided for one or both of pins 15 by which the mirror is normally biased in the position shown in Fig. 3.

Frame 10 has a flange portion 18 on the upper front side thereof, and a flange portion 19 on the lower rear portion thereof, which flanges form abutments for the edge portions of mirror 16 when in the normal vertical position. A lever 20 is pivotally mounted at 21 to an extension 22 on the lower side of frame 10 and has an angularly disposed tip 23 which is adapted to extend above the lower edge of mirror 16 and retain the mirror in the vertical position until released and a spring 24 suitably connected to lever 20 and frame 10 retains the lever in the mirror engaging position.

Bracket 11 has an angular position 25 which is provided with a resilient element 26 which forms an abutment to limit the pivotal movement of the mirror. If desired, a pad or the like 27 may be secured to the lower edge of the mirror for convenience in manipulating the same as should be clear.

Figure 2:
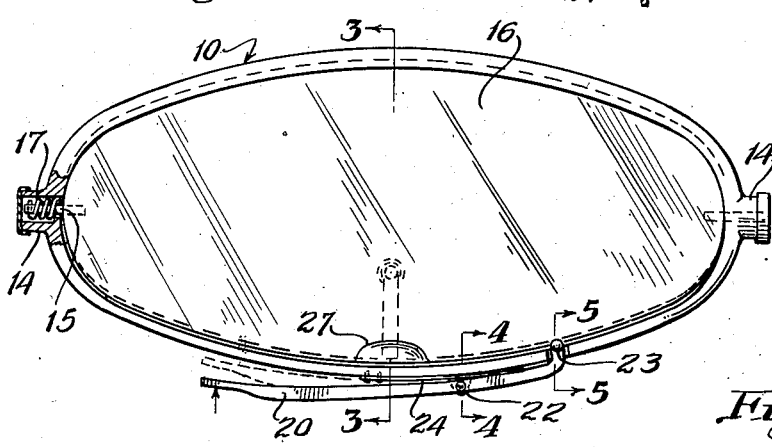
Fig. 2 is a front view of the mirror embodying the invention.
Figure 4:
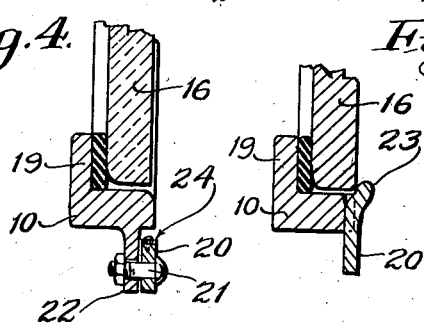
Fig. 4 is a fragmentary sectional view taken along the line 4—4 of Fig. 2.
Figure 4:
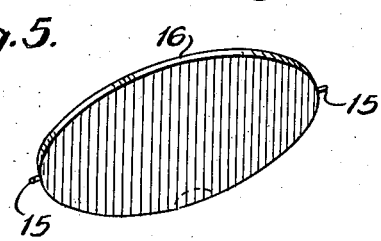

The operation of the invention should be apparent from the foregoing description. The mirror is normally retained in the position shown in Fig. 2 and when the glare from the head lights of a motoring vehicle strikes the mirror and the eyes of the driver, the latter can by tipping lever 20 release the engagement of tip 23 and the lower side of the mirror and the mirror will be swung by the action of spring or springs 17 to the position shown in Fig. 3 in which position the glare of said head lights will not strike the eyes of the driver. When the cause of the glare has been removed the mirror can be readily swung back to the original position manually and tip 23 of lever 20 will be automatically depressed while the edge of the mirror passes over it and thereafter hold the mirror in vertical position. During this latter movement spring or springs 17 will be energized for the next opening movement.

Having described my invention, what I claim is:

A device of the character described comprising a frame adapted to be supported within a motor vehicle and having an abutment, a mirror pivotally mounted on said frame between a normal vertical position and an inclined adjusted position, a spring on said mounting adapted to pivot said mirror, said abutment adapted to limit said pivotal movement in one direction, a releasable spring biased pivoted catch on said frame adapted to retain said mirror in normal position and a finger abutment adapted for returning said mirror to the normal position after actuation to the adjusted position.

JOSEPH QUINTILE.